J. S. LYNCH.
REVOLVING CULTIVATOR HOE.
APPLICATION FILED DEC. 22, 1911.
1,045,863.
Patented Dec. 3, 1912.
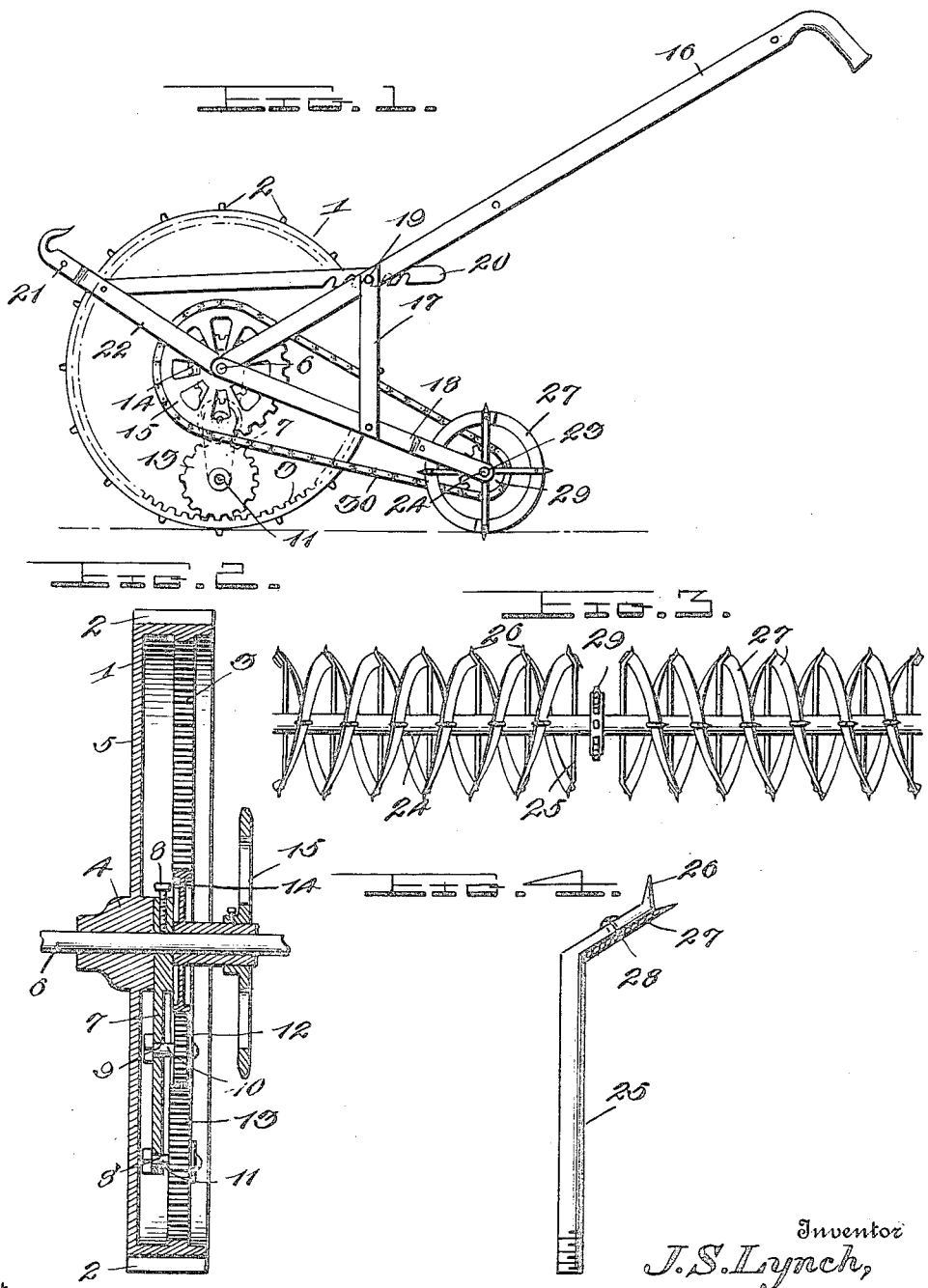
Inventor
J. S. Lynch,
By Watson E. Coleman.
Attorney

UNITED STATES PATENT OFFICE.

JAMES S. LYNCH, OF CITRONELLE, ALABAMA.

REVOLVING CULTIVATOR-HOE.

1,045,863.   Specification of Letters Patent.   Patented Dec. 3, 1912.

Application filed December 22, 1911. Serial No. 667,372.

*To all whom it may concern:*

Be it known that I, JAMES S. LYNCH, a citizen of the United States, residing at Citronelle, in the county of Mobile and State of Alabama, have invented certain new and useful Improvements in Revolving Cultivator-Hoes, of which the following is a specification, reference being had to the accompanying drawings.

This invention relates to agricultural apparatus and more particularly to that class of devices known as hoes.

The main object of this invention is to provide a hoe which will effectually shear the surface of the soil and at the same time pulverize the same thoroughly.

Another object of this invention is to have the device as simple as possible so that it may be readily and cheaply manufactured, and so that its parts will be arranged so as to permit easy inspection and repair whenever the same is desirable.

Other objects of this invention will become apparent as it is more fully set forth.

In the accompanying drawings which illustrate by way of example an embodiment of this invention, Figure 1 represents a view in elevation of a hoe embodying this invention. Fig. 2 is a sectional view taken through the main wheel of Fig. 1. Fig. 3 is a detail of the blades of a hoe; and Fig. 4 is a detail of one of the standards used in this device.

Similar reference characters refer to similar parts throughout the drawings.

The reference character 1 represents the main wheel of the device in question, which is provided with a plurality of toes 2 on the outside thereof. The main wheel is provided with an annular gear 3 on its interior surface, and is secured to its hub 4 by means of a side plate 5, as is clearly shown in the drawings.

6 is a suitable axle for the hub and has a holder 7 provided thereon and fastened thereto by means of a set screw 8. The holder 7 is provided with holes 8' and 9 respectively therein for the purpose of permitting bolts 10 and 11 respectively to extend therethrough and support the pinions 12 and 13 thereon.

A central gear 14 is loosely mounted on the shaft 6 and is arranged to engage with the gear 12, as is clearly shown in the drawings. A sprocket 15 is mounted on the hub of the gear 14 and rigidly secured thereto, so as to move therewith. The gear 12 is arranged to engage with the gear 13, which in turn engages with the annular gear 3 and is actuated thereby, when the wheel 1 is rotated.

Loosely mounted on the shaft 6 is a handle member 16, that is provided with suitable braces 17 that are arranged to hold a pair of arms 18 in rigid relation thereto, as is clearly shown in Fig. 1. A rod 19 extends through the braces 17 and the handle member 16 and is arranged to engage with a pair of slotted members 20 that extend on either side of the wheel 1 and keep a draft hook 21 in a position to suit the means drawing the device over the fields or the like to be hoed. Arms 22 extend from the shaft 6 and interconnect with the draft hook 21 and the members 20.

The arms 18 are provided with holes 23, in their lower portions, of suitable size to permit a shaft 24 to freely rotate therein. This shaft is provided with a plurality of threaded holes therein in which extend the standards 25, which are preferably of the shape shown in Fig. 4, and are provided with sharpened points 26 arranged to engage with the ground, when the shaft is rotated. A number of helically shaped knives 27 are disposed on the shaft 24 and secured to the standards 25 by means of suitable means 28. A suitable sprocket 29 is provided in the central portion of the shaft and is actuated by a chain 30, which in turn is operated by the sprocket 15.

The general position and angle of the knives 27 are, as shown in Fig. 3. The knives on each side are arranged to shear away from the central portion of the shaft.

The general operation of the device is as follows:—When the wheel 1 is rotated, its annular gear 3 rotates with it and actuates the gear 13, which in turn rotates the idler 10, and thereby actuates the gear 14, and causes the sprocket 15 to rotate and operate the knives 27, through the various parts of the transmission mechanism used in connection therewith. The rate of rotation of the knives is fixed by using suitable gearing. As the knives rotate the points 26 engage with the ground and slightly break up the same and provide furrows for the knives to follow into. The knives 27 then cut diagonally into the ground and shear it as it were and slightly turn it over in a manner similar to that of the hoe. As the succeeding knives and standards or parts of the same engage with the soil, they turn the same over more and pulverize it thoroughly. By arranging the standards 25 as is clearly shown in the drawings, a means is provided for not only providing the necessary digging action to the device, but also a substantial bracing means for the knives themselves, and by arranging the standards with threaded ends, and attaching the knives thereto in the manner shown and described, an arrangement is provided which permits the ready removal or interchanging of these various parts whenever the same is desirable.

Obviously it is not desired to limit this application for patent in any other way otherwise than necessitated by the prior art, as many modifications in the construction thereof may be made without departing from the principles thereof and coming within the scope of the appended claims.

Having thus described this invention, what is claimed is:—

1. In a device of the class described, a shaft, a plurality of spirally disposed knives, means for supporting said knives on said shaft, soil digging means disposed on the last mentioned means, and means for actuating said shafts.

2. In a device of the class described, a shaft, a plurality of spirally disposed knives, a plurality of standards on said shaft for supporting said knives, said standards having sharpened ends arranged to engage with the soil and provide furrows for the knives to follow into, and means for actuating said shafts.

3. In a device of the class described, a shaft, standards secured to said shaft and projecting perpendicularly therefrom and formed with obliquely disposed and laterally turned ends with pointed extremities, and spiral knives secured to the obliquely disposed ends of the standards.

In testimony whereof I hereunto affix my signature in the presence of two witnesses.

JAMES S. LYNCH.

Witnesses:
C. A. BERGMAN,
G. T. JORDAN.